United States Patent [19]
Onishi et al.

[11] Patent Number: 5,299,114
[45] Date of Patent: Mar. 29, 1994

[54] SEQUENCE PROGRAM SEARCH METHOD

[75] Inventors: Yasushi Onishi; Masashi Hakoshima, both of Minamitsuru, Japan

[73] Assignee: Fanuc Ltd., Minamitsuru, Japan

[21] Appl. No.: 776,290

[22] PCT Filed: Apr. 26, 1991

[86] PCT No.: PCT/JP91/00582
§ 371 Date: Dec. 9, 1991
§ 102(e) Date: Dec. 9, 1991

[87] PCT Pub. No.: WO91/17489
PCT Pub. Date: Nov. 14, 1991

[30] Foreign Application Priority Data

May 10, 1990 [JP] Japan ................... 2-120529

[51] Int. Cl.⁵ .................... G06F 15/46; G06F 9/00
[52] U.S. Cl. ................... 364/147; 364/192; 364/DIG. 2; 364/949; 364/926.9; 395/275
[58] Field of Search ........... 364/147, 146, 140, 141, 364/191-193, 188, 189, 136, DIG. 2, DIG. 1; 395/275, 575, 700, 375

[56] References Cited

U.S. PATENT DOCUMENTS

| | | | |
|---|---|---|---|
| 4,292,666 | 9/1981 | Hill et al. | 364/147 |
| 4,636,977 | 1/1987 | Ikemoto et al. | 364/419 |
| 4,991,076 | 2/1991 | Zifferer et al. | 364/147 |
| 5,113,359 | 5/1992 | Kiya et al. | 364/147 X |
| 5,126,956 | 6/1992 | Komiya et al. | 364/147 X |

Primary Examiner—Joseph Ruggiero
Attorney, Agent, or Firm—Staas & Halsey

[57] ABSTRACT

To improve searching for a net in the sequence program of a programmable controller (PC), a mark is set for a desired net (10a, 10b). Each time a forward operation key (13d) is depressed, a next (forward) net with a mark is searched for and displayed. Each time a backward operation key (13a) is depressed, a previous (backward) net with a mark is searched for and displayed. When marks are set for logically-related nets, reference can be easily made to the related nets, and thus the time needed for debugging and the like can be shortened.

4 Claims, 4 Drawing Sheets

SEQUENCE PROGRAM SEARCH METHOD

BACKGROUND OF THE INVENTION

The present invention relates to a sequence program search method of searching for a net in the sequence program of a programmable controller (PC), and more specifically, to a sequence program search method by which a required net can be easily found when the sequence program is debugged, or the like.

1. Field of the Invention

Programs in a ladder form are widely used in the sequence programming of a programmable controller (PC), and these ladder programs are expressed in a relay logic form, where one logic line is referred to as a net.

The ladder program is created by a program creation unit, and after having been debugged, is stored in the programmable controller (PC) for use. When the ladder program is debugged, a search must be made for a required net.

For example, if a coil signal is not actuated when needed, a search must be made for a contact signal used for actuating the coil signal. Usually, this search is carried out by using the symbol or net number, or the like, of the contact signal.

Nevertheless, since respective contact signals are not always arranged sequentially, such a search takes a long time, and thus a problem arises when the sequence program is debugged. Further, when the size of the programmable controller (PC) is increased, and accordingly, the capacity of the sequence program is increased, such a search cannot be easily carried out.

In particular, in debugging a search for the same signals must be often made to confirm whether the logic of the sequence program is correct.

SUMMARY OF THE INVENTION

Taking the above into consideration, an object of the present invention is to provide a sequence program search method by which a required net can be easily found due to the provision of a net mark.

To attain the above object, according to the present invention, there is provided a sequence program search method of searching for a net in the sequence program of a programmable controller (PC), comprising the steps of setting a mark for the net, if a search for the net is necessary, and searching for and displaying a next forward net with a mark, each time a forward operation key is depressed, and searching for and displaying a next backward net with a mark, each time a backward operation key is depressed.

Namely, a mark is set for a net to be searched for, e.g., a mark is set for the net of a contact signal for actuating a logic coil. Then, when the forward operation key is depressed, a next forward net with a mark is searched for and displayed, and when the backward operation key is depressed, the routine searches for a next backward net with a mark, and the net is displayed. Therefore, when marks are set for logically-related nets, reference can be easily made to the related nets, whereby the time needed for debugging and the like can be shortened.

DESCRIPTION OF THE PREFERRED EMBODIMENT

An embodiment of the present invention will be described below with reference to the drawings.

Figure 1:
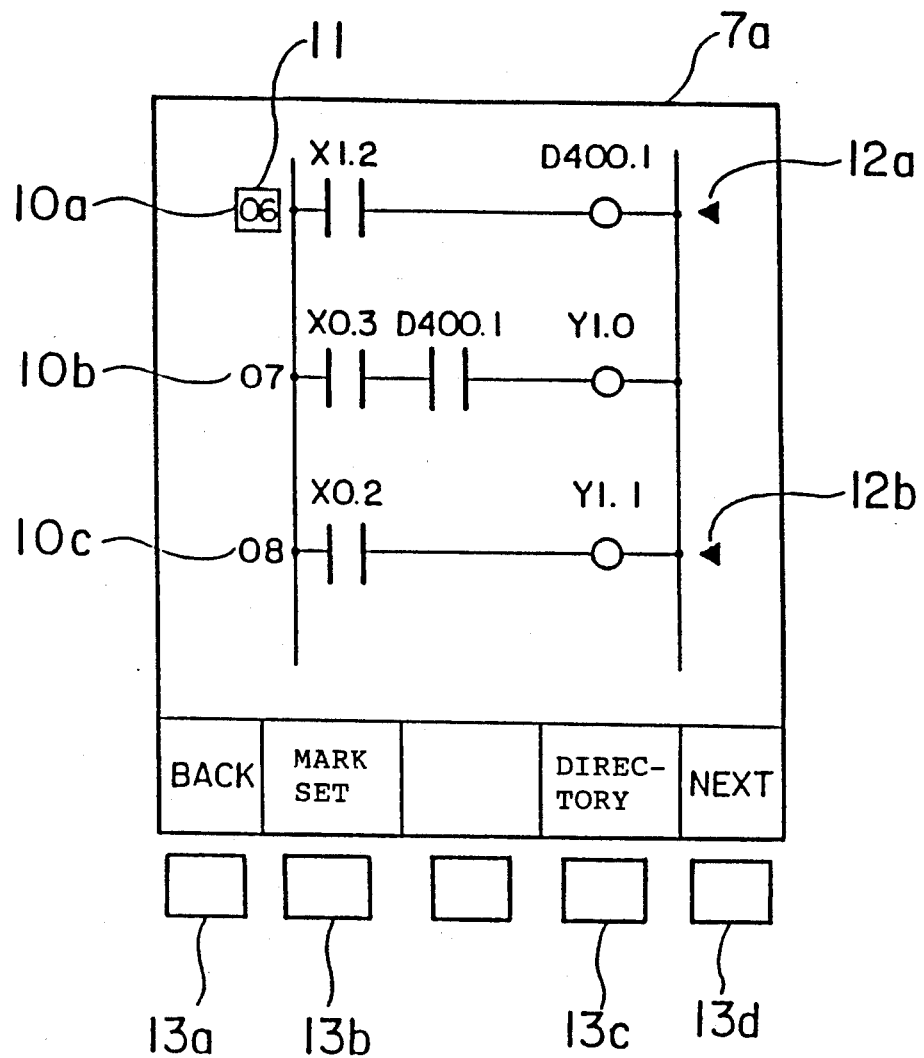
FIG. 1 is a diagram showing an example of a ladder program display screen of a sequence program search method according to the present invention.

FIG. 1 is a diagram showing an example of a ladder program display screen of a sequence program search method according to the present invention. A sequence program in a ladder form is displayed at a ladder program display screen 7a, where 10a, 10b and 10c designate net numbers. First, a cursor 11 is moved or set to a net number 06, to which a mark is to be set, and then a mark set key 13b, such as a soft key, is depressed, whereby a mark 12a is set for the net number 06. In the same way, when the cursor 11 is set to a net number 08 (10c) and the mark set key 13b is depressed, a mark 12b is set for the net number 08.

Next, for example, a NEXT key (forward operation key) 13d is depressed at the position of a net number 01, a search is made for the next marked net, i.e., net number 06, and a display screen shown in FIG. 1 is obtained. When the NEXT key 13d is again depressed, the net number 08 will be found and the net corresponding to net number 08 will be displayed at the uppermost position.

Conversely, when a BACK key (backward operation key) 13a is depressed when a net number 20 is displayed, nearest preceding marked net number is searched for and the net corresponding to net number 08 would be displayed at the upper most position.

Therefore, when marks are set to net numbers relating to a signal chain to be debugged, a desired net can be easily found and displayed.

Although the mark is set by moving the cursor 11 in the above description, the mark may be set in such a manner that the net number is input through a (not shown) numeric keypad, and set by the mark set key 13b.

Figure 2:
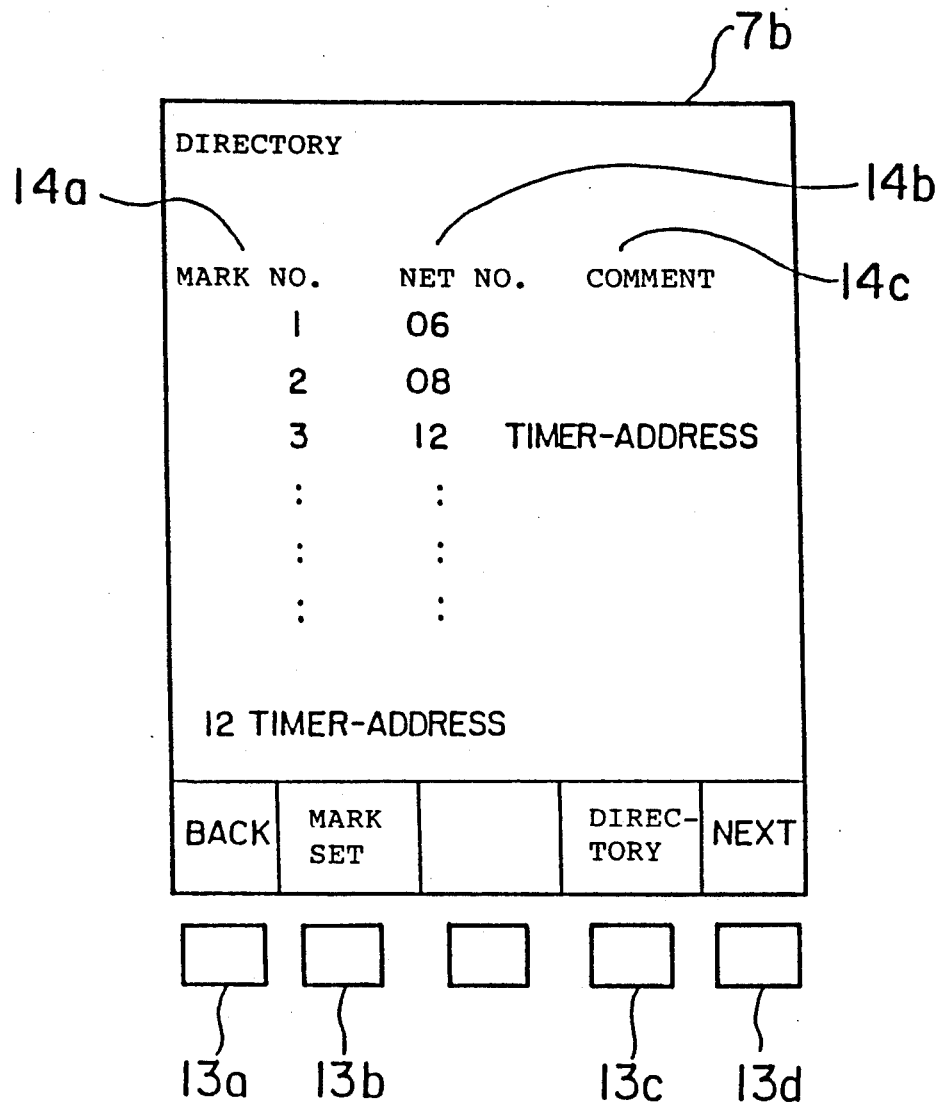
FIG. 2 is a diagram showing an example of a directory screen.

Further, a directory screen is displayed by depressing a directory key 13c in FIG. 1. FIG. 2 is a diagram showing an example of the directory screen. The directory screen 7b has columns for a mark number 14a, net number 14b and comment 14c, and displays respective mark data as a list.

Figure 3:
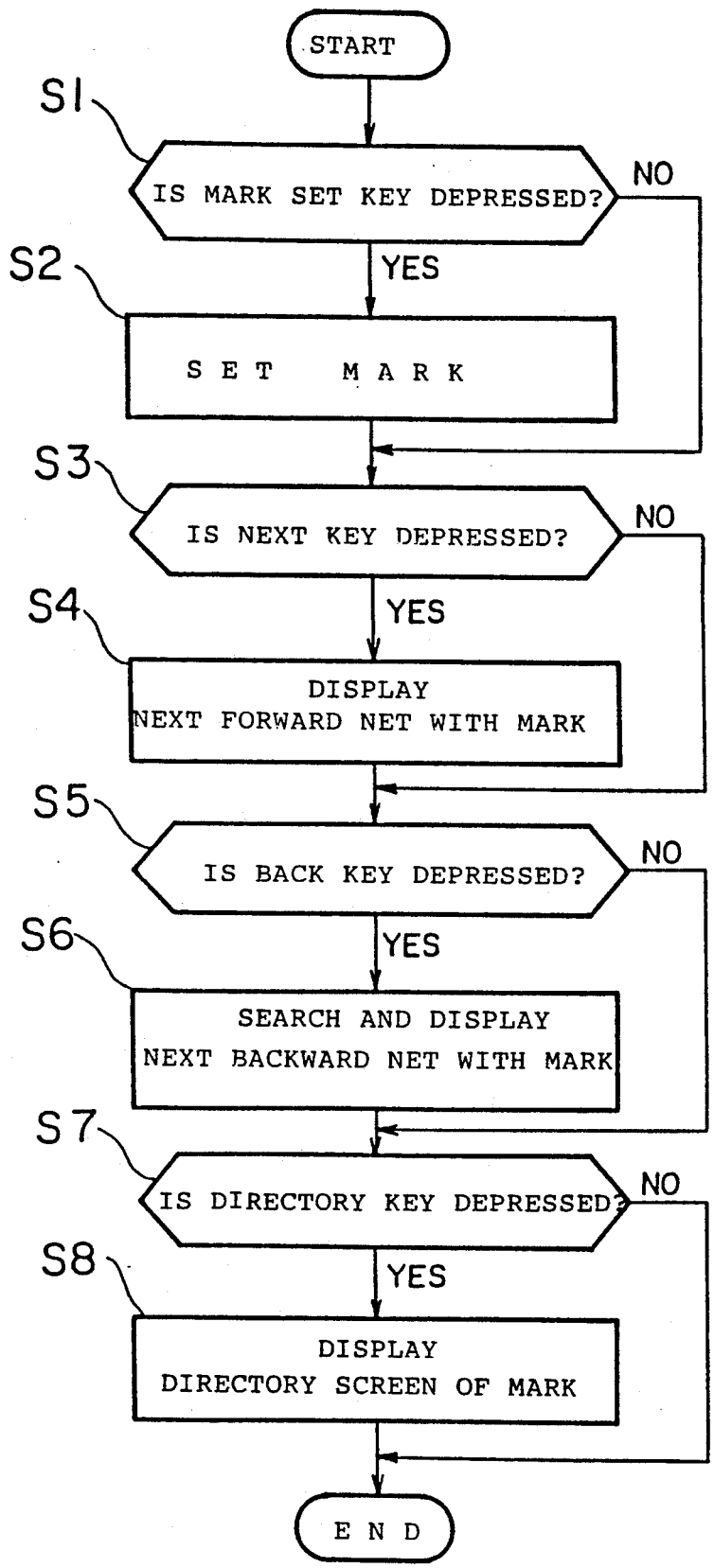
FIG. 3 is a flowchart showing the routine for a sequence program search method according to the present invention.

FIG. 3 is a flowchart showing the routine for the sequence program search method according to the present invention. The performed of the routine are processed by the processor of a program creation unit to be described below.

[S1] When the mark set key 13b is depressed, the routine goes to step S2, and when the mark set key 13b is not depressed, the routine goes to step S3.

[S2] A mark is set for the net at which the cursor is set.

[S3] When the NEXT key 13d is depressed, the routine goes to step S4, and when the NEXT key 13a is not depressed, the routine goes to step S5.

[S4] A next (forward) net with a mark is searched for an that net is displayed at the uppermost position.

[S5] When the BACK key 13a is depressed, the routine goes to step S6, and when the BACK key 13a is not depressed, the routine goes to step S7.

[S6] A previous net with a mark is searched for and displayed at the uppermost position.

[S7] When the directory key 13c is depressed, the routine goes to step S8.

[S8] The directory screen is displayed.

Figure 4:
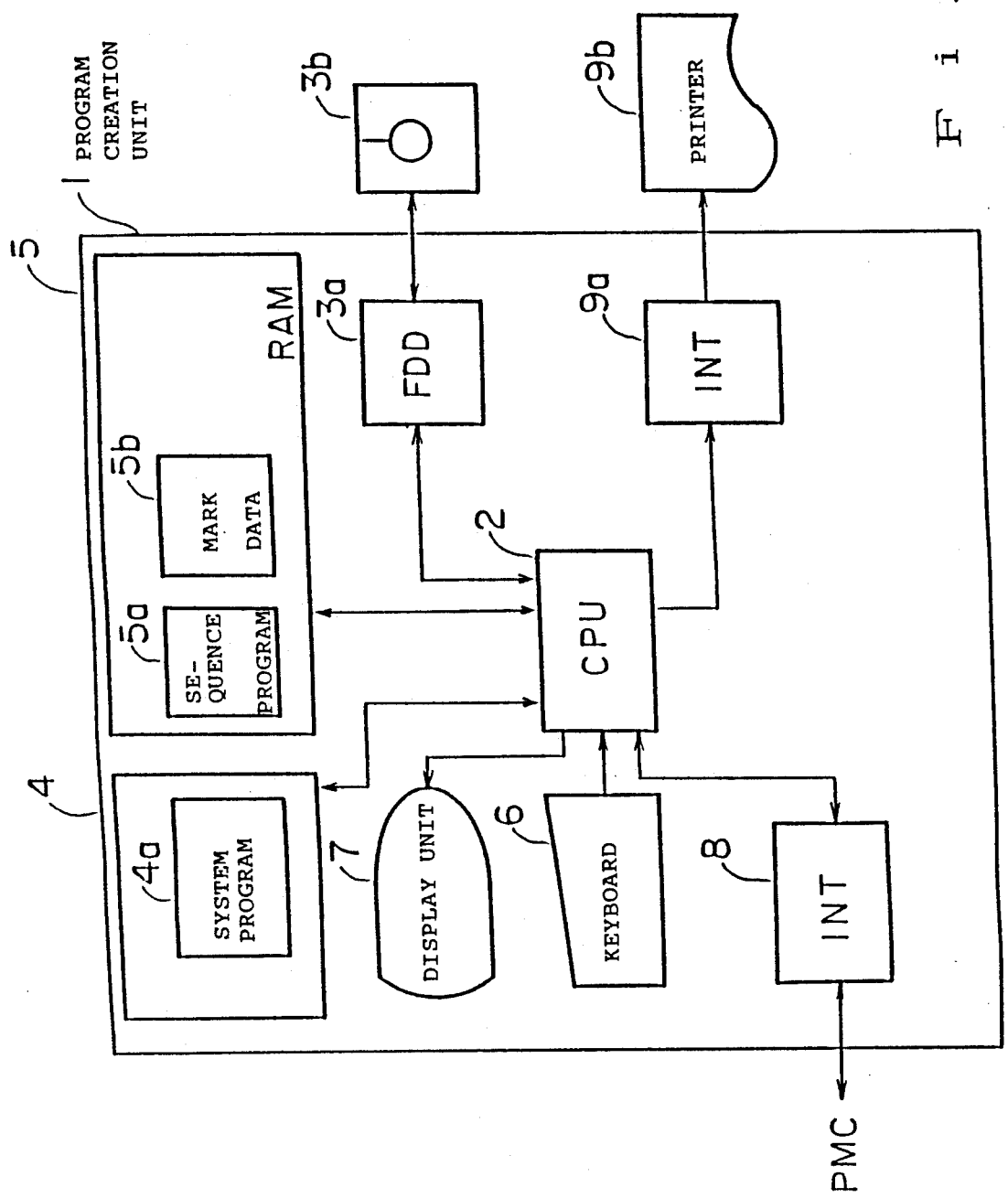
FIG. 4 is a block diagram of a program creation unit embodying the present invention.

FIG. 4 is a block diagram of a program creation unit embodying the present invention. The program creation unit 1 is arranged by using a processor 2 as the central component thereof. A memory 4 for storing a system program 4a therein and a RAM 5 are connected to the processor 2. The RAM 5 stores a sequence program 5a and mark data 5b composed of the mark number, net number and comment.

The sequence program 5a is input through a keyboard 6 and displayed at a display unit 7, if necessary. The display unit 7 displays a ladder program display screen 7a, the directory screen 7b, and the like.

Further, the sequence program may be printed out by a printer 9b, through a printer interface 9a. The sequence program 5a is usually created in a ladder form, but other high-level language such as PASCAL or the like may be used.

On the completion of debugging, the sequence program 5a and mark data 5b stored in the RAM 5 are transferred to a programmable machine controller (PMC) as a kind of programmable controller (PC) contained in a numerical control apparatus, through an interface 8.

Further, the sequence program 5a and mark data 5b can be stored and preserved in a floppy disk 3b through a floppy disk drive 3a.

Although the program search method described above may be carried out by the program creation unit, the method may also be carried out by a PMC contained in a numerical control apparatus. In such a case, the display unit and keyboard of the numerical control apparatus are used.

As described above, according to the present invention, since a mark is set to a required net and this mark is searched for by the operation keys and displayed, the search is easily and simply carried out whereby the efficiency of the debugging work is improved.

What is claimed is:

1. A sequence program search method of searching for a net in a sequence program of a programmable controller, comprising the steps of:
    (a) setting a mark for a net to be searched;
    (b) searching for and displaying a next marked net each time a forward operation key is depressed; and
    (c) searching for and displaying a preceding marked net each time a backward operation key is depressed.

2. A sequence program search method according to claim 1, wherein said setting of the mark in step (a) comprises the steps of:
    (a1) positioning a cursor; and
    (a2) detecting activation of a mark set key.

3. A sequence program search method according to claim 1, wherein said setting of the mark in step (a) comprises the steps of:
    (a1) inputting a net number; and
    (a2) detecting activation of a mark set key.

4. A sequence program search method according to claim 1, further comprising the step of (d) displaying a directory screen listing each marked net.

* * * * *

UNITED STATES PATENT AND TRADEMARK OFFICE
CERTIFICATE OF CORRECTION

PATENT NO. : 5,299,114
DATED : March 29, 1994
INVENTOR(S) : Yasushi Onishi, et. al.

It is certified that error appears in the above-indentified patent and that said Letters Patent is hereby corrected as shown below:

```
Column 1, between lines 4 and 5, insert --FIELD OF THE INVENTION --; and
line 11, delete "Field of the Invention" and insert--DESCRIPTION OF THE
RELATED ART --.
Column 2, line 35, after "displayed" insert --the--;
         line 56, delete "performed" and insert --processes--;
         lines 56-57, delete "processed" and insert --performed--: and
         line 68, delete "an" and insert --and--.
Column 3, line 4, after "previous" insert --(backward)--.
```

Signed and Sealed this

Thirtieth Day of August, 1994

*Attest:*

BRUCE LEHMAN

*Attesting Officer*     *Commissioner of Patents and Trademarks*